United States Patent
Kim

(10) Patent No.: US 6,282,048 B1
(45) Date of Patent: Aug. 28, 2001

(54) TRACKING CONTROL METHOD AND APPARATUS FOR CONTROLLING CAPSTAN MOTOR SPEED

(75) Inventor: Jung-tae Kim, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/171,427

(22) Filed: Dec. 22, 1993

(30) Foreign Application Priority Data

Dec. 23, 1992 (KR) .................................................. 92-25219
Jul. 21, 1993 (KR) .................................................. 93-13793

(51) Int. Cl.$^7$ .................................................. G11B 15/46
(52) U.S. Cl. .......................................................... 360/73.08
(58) Field of Search .............................. 360/73.13, 73.09, 360/73.08, 78.04, 78.06, 73.12, 73.14, 77.16, 70, 72.13, 77.07, 77.12, 77.15; 318/610; 364/162; 369/44.12

(56) References Cited

U.S. PATENT DOCUMENTS

| | | | | |
|---|---|---|---|---|
| 4,791,507 | * | 12/1988 | Doyama et al. | 360/77.15 |
| 4,951,162 | * | 8/1990 | Yoshimura et al. | 360/77.14 |
| 5,231,550 | * | 7/1993 | Hashimoto | 360/78.06 |
| 5,235,478 | * | 8/1993 | Hoshimi et al. | 360/78.08 |
| 5,287,233 | * | 2/1994 | Lee et al. | 360/73.14 |
| 5,459,622 | * | 10/1995 | Tajima et al. | 360/70 |

FOREIGN PATENT DOCUMENTS

604229 * 6/1994 (EP) .
90-098856 * 4/1990 (JP) .
02098856 * 11/1990 (JP) .

OTHER PUBLICATIONS

Translation of JP 2–98856 (Masayuki Takeda).*

* cited by examiner

Primary Examiner—Regina Y. Neal
Assistant Examiner—Son Hoang Nguyen
(74) Attorney, Agent, or Firm—Sughrue, Mion, Zinn, Macpeak & Seas, PLLC

(57) ABSTRACT

In tracking control method and apparatus thereof for an image recorder/reproducer, there are provided a method and device which can accomplish a high-performance tracking control by using the variable capstan speed instruction which is reflected by the degree of tracking error instead of using the conventional capstan speed instruction wherein the tracking error is not reflected. For this, a tracking control method includes the steps of obtaining the degree of tracking control by performing a predetermined gain control on the tracking error, and generating the variable capstan speed instruction wherein the degree of tracking control is reflected, and determining the degree of speed error of capstan motor by comparing the capstan speed instruction with the actual rotation speed of capstan motor, and obtaining the degree of speed control of capstan motor wherein the tracking error is reflected by performing a predetermined gain control on the speed error. Thus, rapid control wherein tracking compatibility during the control is improved, easy coefficient control and single system, are enabled.

2 Claims, 6 Drawing Sheets

TRACKING CONTROL METHOD AND APPARATUS FOR CONTROLLING CAPSTAN MOTOR SPEED

BACKGROUND OF THE INVENTION

1. Field of the Invention

The present invention relates to a tracking control method and apparatus for controlling capstan speed by using a variable capstan speed instruction in the image recorder/reproducer, wherein the amount of tracking error is reflected, thereby carrying out correct tracking.

2. Discussion of Related Art

An image recorder/reproducer such as a VCR or a video camera/recorder (camcorder) generates a poor display when beat frequencies are not properly controlled by tracking. Therefore, good tracking control is essential to obtain a good screen image.

Tracking control operation involves controlling the head correctly to scan a predetermined track, thereby maximizing envelope output during reproduction.

A separate control signal is used for tracking control. In a VHS-VCR, tracking is performed using a control signal which is recorded on a control track of a respective tape by a fixed head. Further, in an 8 mm VCR system, the pilot signal used in automatic track finding (ATF), has four different frequencies, and is recorded on the track of the tape. The pilot signal is used for reproduction in such a way that the tracking error, i.e., the degree of deviation from the track which the current head is scanning, is detected and reduced.

It will be noted that, the detected tracking error can be minimized by controlling the spinning speed of the capstan motor. That is, the object of the tracking control is to determine the optimum spinning speed of a capstan motor.

A conventional tracking control method will be described with reference to the attached drawings.

FIG. 1A and FIG. 1B show the relation between the scanning traces of the head and tracking error of a conventional VCR. For convenience, the generation of a positive error indicates that the head is located prior to the track to be scanned while the generation of a negative error indicates that the head is located after the track is scanned.

Referring to FIGS. 1A and 1B, when the head is located prior to the predetermined track, that is, when the head is located in a P1-level track, the tape proceeds slowly by slowing down the speed of the capstan motor. When the head is behind the predetermined track, that is, when the head is located in a P2-level track, the tape proceeds faster by increasing the speed of the capstan motor. Therefore, the head is controlled to scan the predetermined track correctly.

This basic principle of tracking control is still appropriate for the present invention as well as for the conventional method.

The conventional structure of a capstan servo for tracking control is shown in FIG. 2.

Referring to FIG. 2, the speed control signal for a capstan motor 20 applied to a capstan motor driver 18 is determined by the amount of capstan speed control detected from a tracking controller 12 and the amount of tracking control detected from a capstan controller 14, respectively. An adder 16 adds the above two amounts.

FIG. 3 shows an embodiment wherein the capstan servo system shown in FIG. 2 is applied to a VHS-VCR.

Here, the amount of capstan speed control is calculated under the assumption that there is a predetermined normal track, and the capstan speed instruction (f), which corresponds to the regular spinning speed of the capstan motor and which is needed when the head correctly runs above the normal track, is the reference value. Also, the reference value and the actual speed of a capstan motor 27, as measured by a frequency generator 29 when capstan motor 27 spins, are compared in a capstan speed error detector 21. The degree of error calculated from this comparison is changed into a degree of speed control of capstan motor 27 in a capstan speed controller 22, which is not affected by the degree of tracking control for compensating the tracking error.

The record pulse which is synchronized with the track start point (hereinafter, termed a 'control pulse') is recorded on the control track. Also, the degree of capstan tracking error is output from the capstan phase comparator 23 by means of phase comparison between the control pulse which is reproduced by a fixed head 28 (called a 'control head') and the head switching pulse wherein the prearranged frequency is provided. Then, the degree of capstan error is proportional-integration-differentiation (PID) controlled so as to be output as a degree of capstan tracking control, i.e., a predetermined physical amount, in a capstan phase controller 24, thereby performing phase control of a capstan motor in order to control tracking.

The degree of capstan speed control of capstan speed controller 22 and the degree of tracking control of capstan phase controller 24 are added in an adder 25, and the capstan motor 27 is driven by a capstan motor driver 26.

However, the above-mentioned conventional method generates various kinds of problems when the direction for controlling the speed of the capstan motor and the direction for controlling the tracking are different. The following is an explanation with reference to FIG. 2 and FIG. 4.

FIG. 4 shows the tracking when the head runs along a deviating track modified from the normal track.

As can be seen in FIG. 4, the traces of the head which capstan speed controller 14 aims to control are on the predetermined normal track (the A direction of FIG. 4), while the traces of the head which tracking controller 12 aims to control are on the modified track (the B direction of FIG. 4).

Accordingly, when the direction for controlling the speed of capstan motor 20 and the direction for controlling the tracking are different, correct tracking is difficult since the speed controller prevents the capstan motor 20 from moving in the direction of reducing the tracking error.

Precise gain control for the degree of control for the above two directions is needed to solve the problems. Therefore, the gains of tracking controller 12 and capstan speed controller 14 should be controlled precisely. However, the design of the device which is additionally required for the gain control as well as the gain control itself is difficult. Even though the device has a gain control function, there is still a problem of compatibility between the two devices if the recording device and the reproduction device are different.

The deterioration in tracking is not a significant problem in a VHS-VCR or in an 8 mm VCR, since the width of the track is quite large (58 $\mu$m for VHS, and 21 $\mu$m for 8 mm). However, there is a problem of lowered performance for the case of digital VCR which requires high density recording, because very high performance tracking is needed if the track width is below 10 $\mu$m.

SUMMARY OF THE INVENTION

Accordingly, it is an object of the present invention to provide a method and device thereof which can control tracking by using a variable capstan speed instruction, wherein the degree of tracking control calculated from the tracking error is reflected in the capstan speed instruction, instead of using the conventional capstan speed instruction wherein the tracking error is not reflected as in the prior art. The capstan speed instruction is used as a reference value which is used for calculating the degree of capstan motor speed control.

According to an aspect of the present invention, there is provided a tracking control method for an image recorder/ reproducer which converts the applied tracking error into a degree of capstan speed control and in generating a driving signal for a capstan motor, wherein the tracking control method comprises the steps of:

calculating a degree of tracking control, which performs a predetermined gain control on the tracking error and converting the gain-controlled tracking error into the degree of tracking control;

generating a speed instruction, which generates the variable capstan speed instruction reflecting the degree of tracking control;

determining a speed error, which compares the capstan speed instruction and the actual spinning speed of the capstan motor and then determines the degree of speed error of the capstan motor; and calculating a degree of speed control, which performs a predetermined gain control on the speed error, and calculating the degree of speed control of the capstan motor wherein the tracking error is reflected.

Furthermore, there is provided a tracking control apparatus for an image recorder/reproducer which converts the applied tracking error into a degree of capstan speed control in generating the driving signal for a capstan motor, wherein the tracking control apparatus comprises:

a tracking controller which outputs a variable capstan speed instruction from a degree of tracking control calculated by performing a predetermined gain control on the tracking error;

a capstan speed controller which performs a predetermined gain control by a speed error of the capstan motor calculated by comparing an actual capstan speed with a reference value, i.e, the above capstan speed instruction, and outputs a degree of capstan speed control.

The present invention, which comprises the above means, is based on the above-mentioned basic principle of tracking control like the conventional method. As compared with the conventional method, however, wherein the degree of capstan speed control is separately calculated from the degree of tracking control, the basic difference is that the degree of capstan speed control of the present invention has a dependent relationship with the degree of tracking error (or the degree of tracking control) since the degree of capstan speed control of the present invention is reflected by the degree of tracking error (or the amount of tracking control).

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The present invention will be described below in more detail with reference to the attached drawings.

First, the process of calculating the degree of tracking control will be explained.

The process of calculating the degree of tracking control is one in which the tracking error is selectively multiplied by a predetermined gain, differentiated and/or integrated, thereby determining the degree of tracking control. That is, a proportional-integration-differentiation (PID) control is accomplished.

Here, the characteristic expressing the degree of tracking error is variable. That is, the characteristic varies depending on the calculating apparatus which calculates the degree of tracking control from the degree of tracking error. For example, the tracking error will be explained in terms of the phase difference when the tracking error is calculated by comparing the reference signal with the phases of control pulses on tape which is read with a head, assuming that the head switching pulse of a predetermined frequency is provided is the reference signal. When the pilot signal, with four different frequencies, is used, the frequency difference characterizes the tracking error.

The following is the process of generating the speed instruction.

This process is for obtaining a capstan speed instruction, i.e., a reference value which is needed for calculating the speed error of the capstan motor and particularly, for obtaining a capstan speed instruction wherein the degree of tracking control is reflected.

The method for obtaining the capstan speed instruction wherein the degree of tracking control is reflected can be variable. One possible method is that the degree of tracking control obtained from a gain control performed on the tracking error and the capstan speed instruction needed when the tracking error is not considered are added, the result of which is then used as a capstan speed instruction of the process of generating a speed instruction.

Here, the degree of tracking error is not a constant value, thus the capstan speed instruction is a variable value.

Also, the process of calculating the amount of tracking control should be performed prior to the process of generating the speed instruction wherein the capstan speed instruction is generated.

Figure 5:
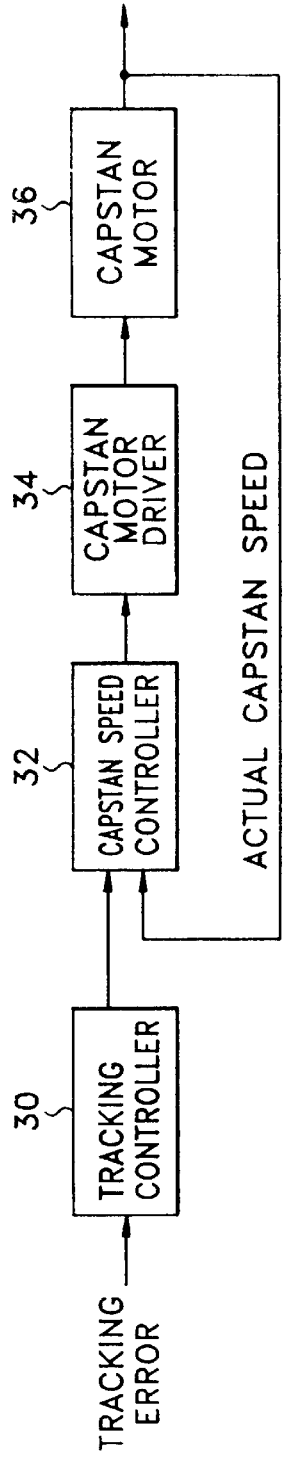
FIG. 5 is a block diagram showing the structure of a tracking control apparatus of a VCR according to the present invention.

FIG. 5 is a block diagram of a tracking control device of a VCR according to the present invention.

Reference numerals 30, 32, 34 and 36 denote a tracking controller, a capstan motor speed controller, a capstan motor driver and a capstan motor, respectively.

Here, tracking controller 30 is directly used for the processes of calculating the needed degree of tracking control and generating a speed instruction.

Figure 4:
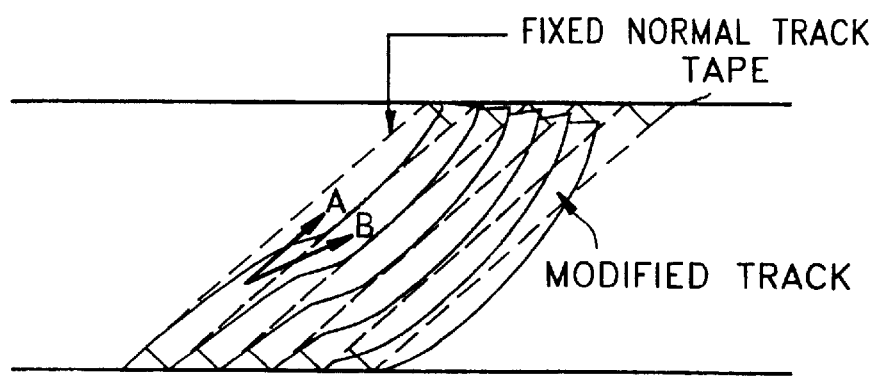
FIG. 4 comparatively illustrates the trackings in the normal track and in the modified track which tracking is equally applicable to the devices in FIGS. 2 and 3 and to the present invention.
Figure 2:
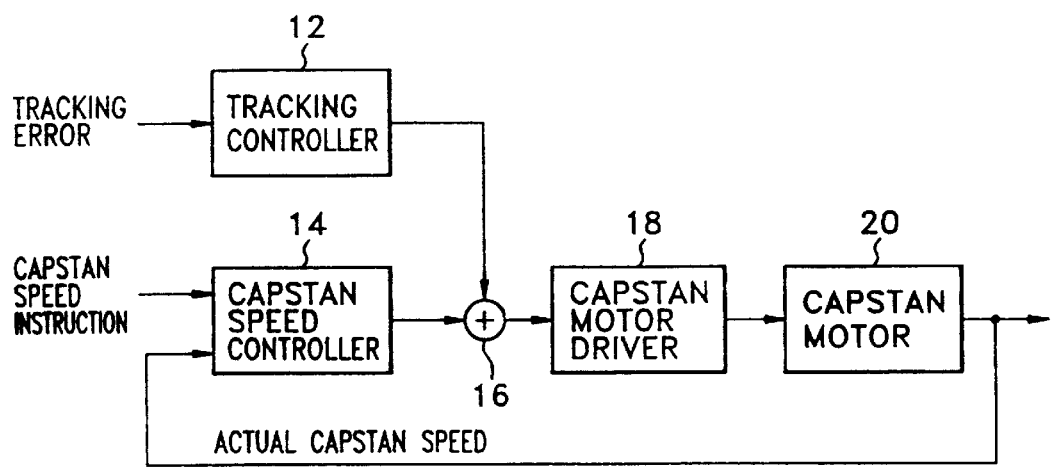
FIG. 2 is a block diagram showing the capstan servo system for the conventional tracking control.
Figure 3:
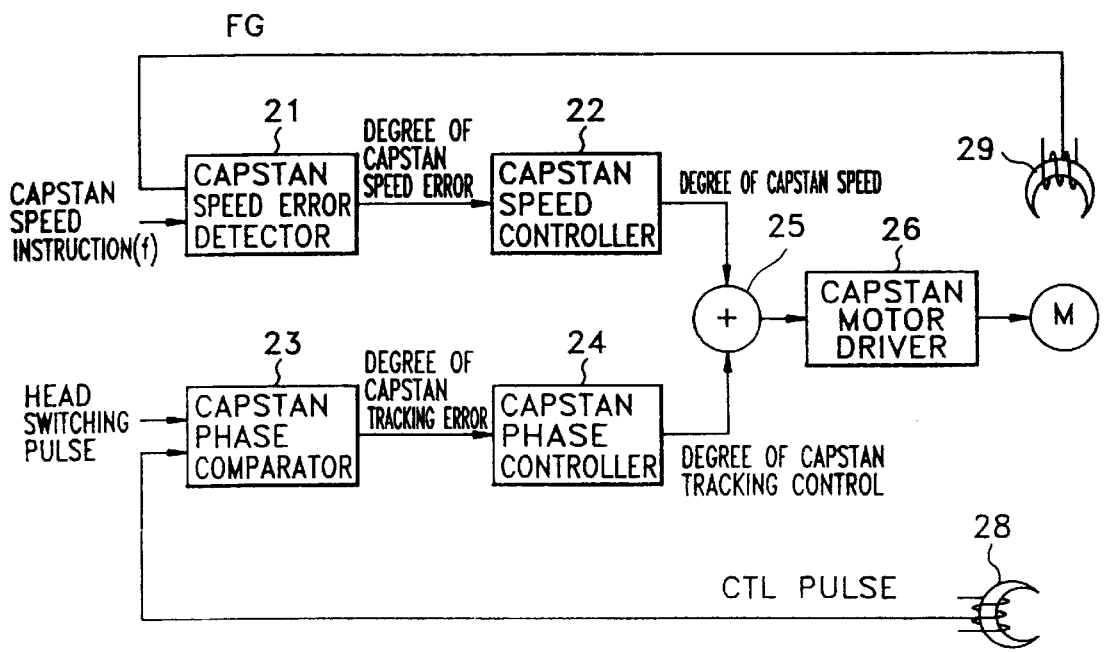
FIG. 3 illustrates an example wherein the capstan servo system shown in FIG. 2 is applied to a VHS-VCR.

Referring to FIG. 4, the capstan speed instruction obtained from tracking controller 30 is used as a comparative reference value in estimating the speed error of the capstan motor, as described above, like the capstan speed instruction obtained from the conventional tracking controller 12 of FIG. 2. However, the process of estimating the capstan speed instruction is different from the conventional method in that of the present invention has a close relation with the degree of tracking error. That is, the capstan speed instruction for FIG. 4 is obtained under the assumption that the degree of tracking control is calculated.

Figure 1A:
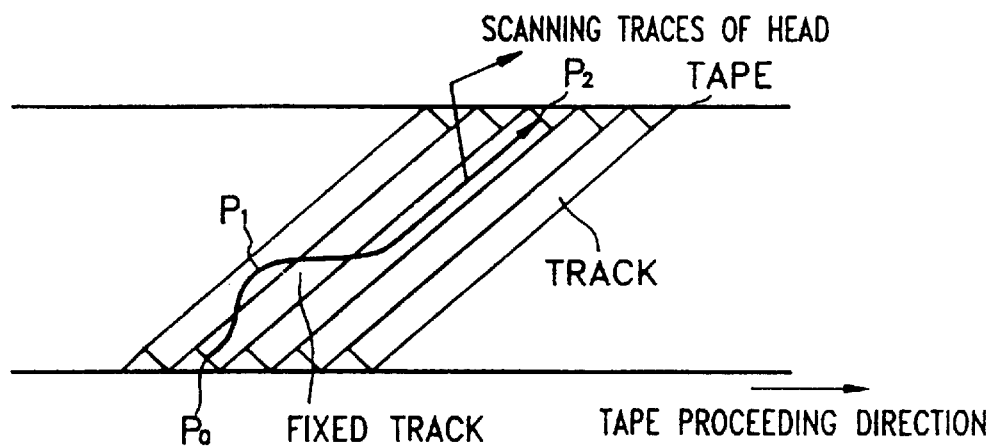
FIG. 1A and FIG. 1B show the relation of scanning traces of head and tracking error of a VCR.
Figure 1B:
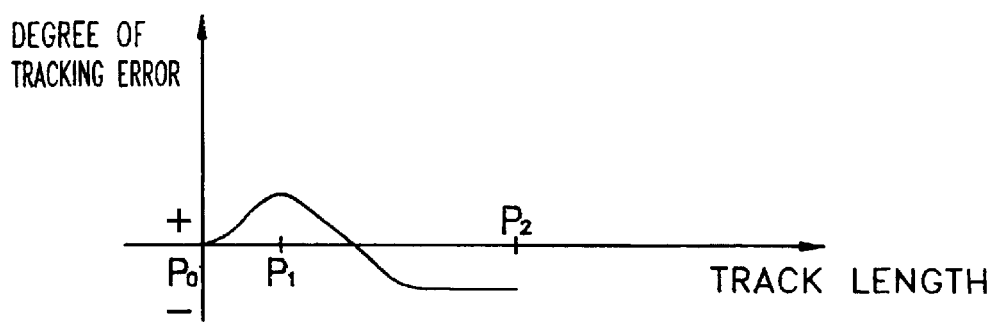

Meanwhile, the capstan speed instruction obtained from tracking controller 30 is a variable value which includes the degree of tracking control according to the tracking error and varies as follows. That is, when the head is prior to the track that is to be scanned (i.e., when the head is located in a P1-level track in FIG. 1A and the tape speed has to be slowed), the value of the capstan speed instruction changes in the direction wherein the speed of the capstan motor is decreased. On the contrary, when the head is behind the track that is to be scanned (i.e., when the head is located in P2-level track in FIG. 1A and the tape speed should be increased), the capstan speed instruction value changes in the direction wherein the capstan motor speed is increased.

Here, the physical dimension expressing the amount of tracking control and the capstan control instruction is variable. That is, the two physical amounts can be expressed in various forms depending on the apparatus conducting the process. For example, the spinning speed of the capstan motor is generally expressed as the pulse frequency output from the frequency generator (FG). Therefore, it is convenient that the degree of the capstan speed instruction corresponds to the pulse frequency.

The following is the description on the process of determining the speed error.

The degree of speed error of the capstan motor which is obtained in the process of determining the speed error is calculated by comparing the capstan speed instruction and the actual spinning speed of capstan motor. That is, the difference between the reference value and the magnitude of the actual spinning speed is the same as the speed error of the capstan motor, assuming that the capstan speed instruction is a reference value.

Accordingly, the degree of speed error calculated in the process of determining the speed error is the degree of error caused by reasons other than the tracking error, and the conventional process which adds the degree of speed error to the degree of tracking control is unnecessary.

The following is the description on the process of calculating the degree of speed control.

The process of calculating the degree of speed control is for calculating the degree of speed control of the capstan motor needed for reflecting the degree of error obtained from the previous process, i.e., the process of determining the speed error, on the spinning speed of the capstan motor most stably, promptly and correctly. The degree of speed control is utilized as a driving signal of the capstan motor by the driving means of the capstan motor.

Capstan speed controller 32 of FIG. 5 acts as the means for determining the speed error and calculating the degree of speed control.

A preferred embodiment of the present invention will be described below with reference to the attached drawings.

Figure 6A:
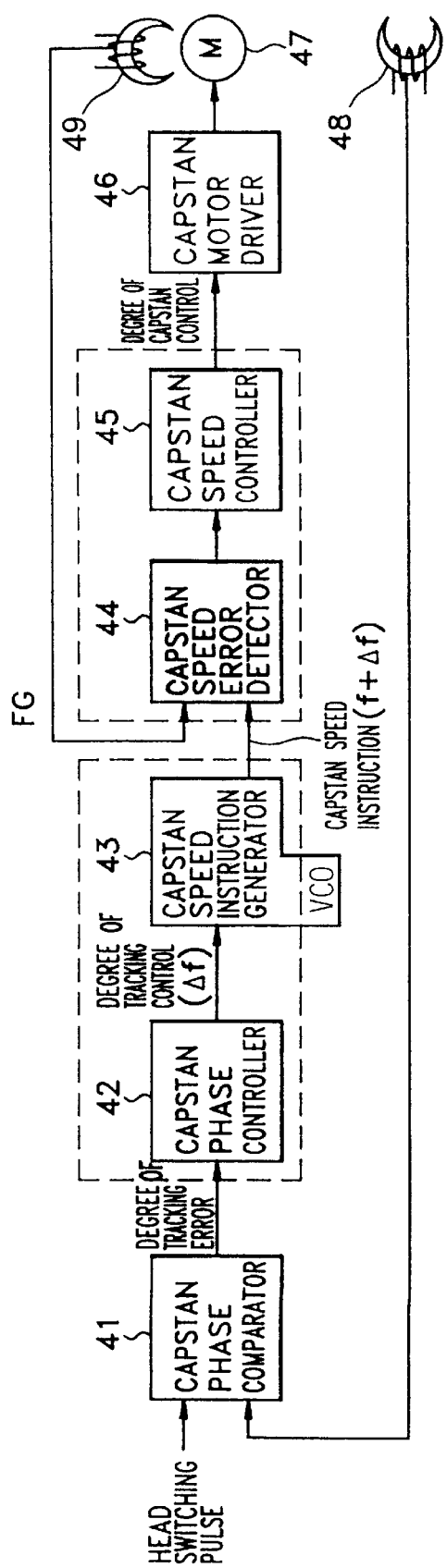
FIG. 6A is a block diagram showing an embodiment of a tracking control apparatus of a VCR according to the present invention.

FIG. 6A is a block diagram showing an embodiment of the apparatus used for performing the method of the present invention, wherein the method of the present invention is applied to a VHS-VCR.

Referring to FIG. 6A, reference numeral 41 denotes a capstan phase comparator, 42 denotes a capstan phase controller, 43 denotes a capstan speed instruction generator, 44 denotes a capstan speed error detector, 45 denotes a capstan speed controller, 46 denotes a capstan motor driver, 47 denotes a capstan motor, 48 denotes a fixed head, and 49 denotes a frequency generator.

The following is the description of the operation of the apparatus of FIG. 6A.

Capstan phase comparator 41 compares the phases of a head switching pulse of a predetermined frequency and of the control pulse which is reproduced by fixed head 48, and then calculates the tracking error.

Capstan phase controller 42 performs PID control on the tracking error, which then is output as a value corresponding to the degree of tracking control. Capstan speed instruction generator 43 outputs the variable capstan speed instruction which corresponds to the frequency of the pulse representing the degree of tracking control.

Here, capstan phase controller 42 and capstan speed instruction generator 43 correspond to tracking controller 30 of FIG. 5.

When the degree of tracking control output from capstan phase controller 42 is a voltage signal whose size corresponds to the tracking error, capstan speed instruction generator 43 can be constructed using a voltage-controlled oscillator (VCO) which outputs the frequency signal that corresponds to the degree of tracking control, i.e., a voltage.

Meanwhile, capstan speed error detector 44 compares the capstan speed actually measured from frequency generator 49 and the capstan speed instruction, i.e., a reference value, provided by capstan speed instruction generator 43, and then calculates the speed error of the capstan motor. Capstan speed controller 45 performs PID control on the speed error of capstan motor, and outputs a capstan speed control signal.

The capstan speed error detector 44 and the capstan speed controller 45 correspond to the capstan speed controller 32 of FIG. 5.

Figure 6B:
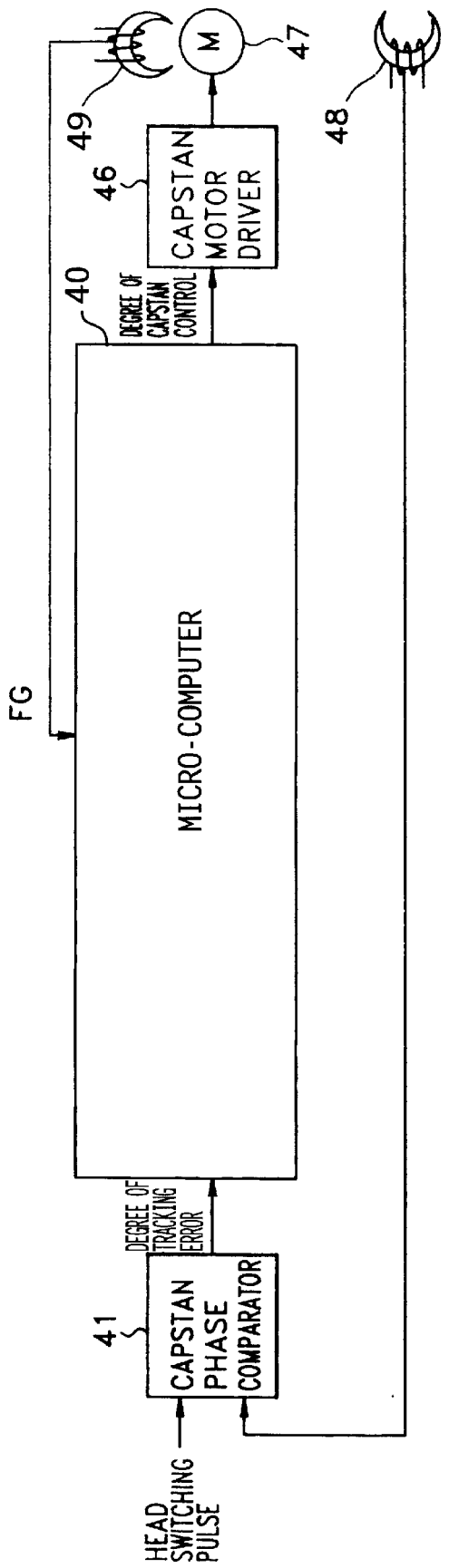
FIG. 6B is a block diagram showing a variation on the embodiment of FIG. 6A.

Tracking controller 30 and capstan speed controller 32 may use hardware for performing their functions. They also may use a microcomputer 40 provided with software which can perform the functions of the hardware, as shown in FIG. 6B.

Figure 7:
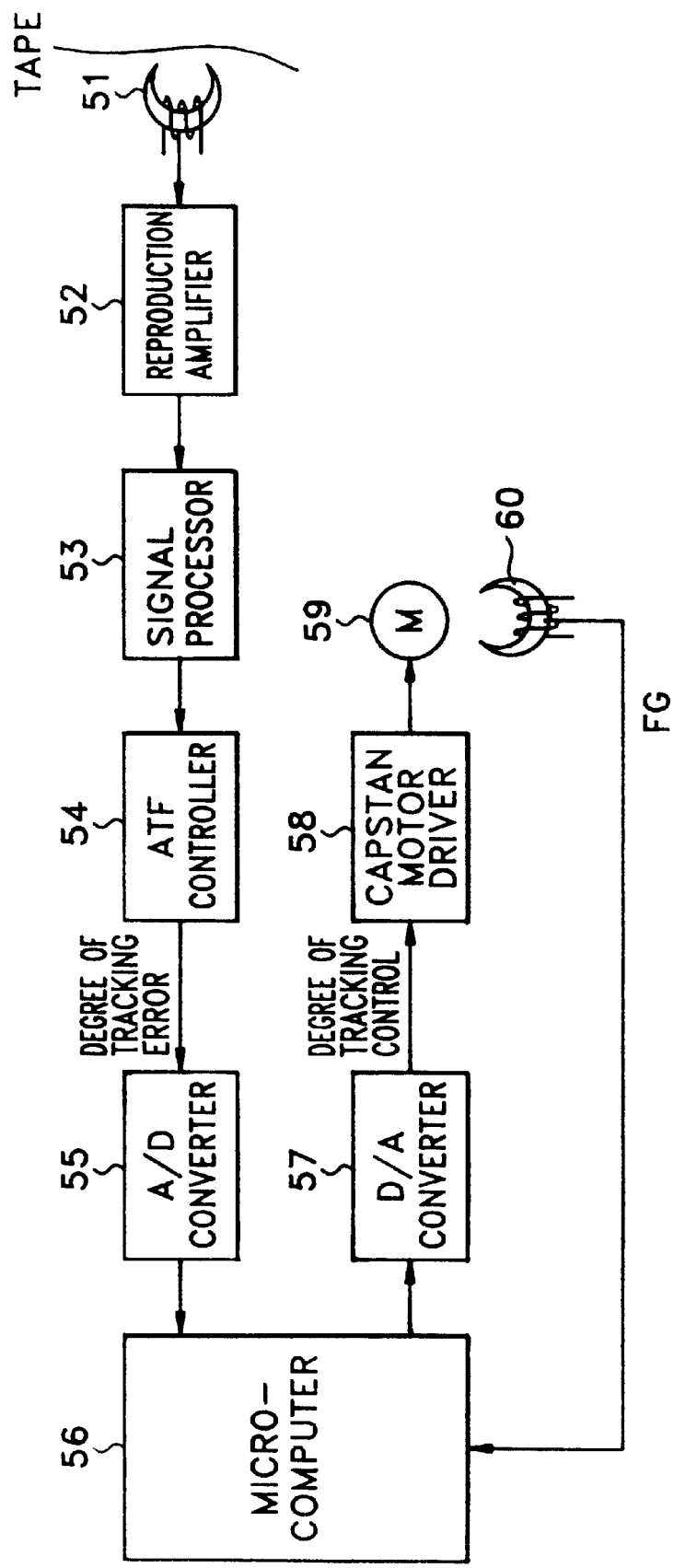
FIG. 7 is a block diagram showing another embodiment of a tracking control apparatus of a VCR according to the present invention.

FIG. 7 is a block diagram showing another embodiment of the tracking control apparatus according to the present invention for use with an 8 mm VCR.

Referring to FIG. 7, reference numeral 51 denotes a reproduction head, 52 denotes a reproduction amplifier, 53 denotes a signal processor circuit, 54 denotes a ATF controller, 55 denotes an A/D converter, 56 denotes a microcomputer, 57 denotes a D/A converter, 58 denotes a capstan motor driver, 59 denotes a capstan motor, and 60 denotes a frequency generator.

The following is the description on the operation of apparatus of FIG. 7.

Reproduction amplifier 52 receives the signal recorded on the tape from reproduction head 51 and then amplifies the signal.

The frequency bands of the signals recorded on 8 mm video tape can be described as follows. Four kinds of pilot signals (f1–f4) are recorded in a 100 KHz to 160 KHz band, and the FM audio (AFM) signal is recorded in a 1.4 MHz to 1.6 MHz band, a color signal which is AM-modulated into the central frequency of 743 KHz, and a luminance signal of 4.2 MHz to 5.4 MHz are recorded.

Signal processor 53 detects an image signal, an audio signal and a pilot signal for discriminating the tracks which are recorded so as to have a specific band as described above, and then processes the signals.

ATF controller 54 detects the degree of ATF error among the signals output from signal processor 53 using the pilot signal, and converts the degree of ATF error, using A/D converter 55 into the form of a digital signal, and then outputs the converted signal to microcomputer 56.

Among the specific frequencies of the four pilot signals, f1 is 102.544 KHz, f2 is 118.951 KHz, f3 is 165.21 KHz and f4 is 148.689 KHz.

The difference of the pilot output level is checked and used as a tracking error signal. That is, the following expression obtains the tracking error signal; the degree of deviation of the head from the track can be discriminated depending on the spectral component.

$$|f1-f2|=|f3-f4|=\Delta fA=fH$$

$$|f1-f4|=|f2-f3|=\Delta fB=3fh$$

Microcomputer 56 performs a predetermined gain control on the amount of ATF error (tracking error), thereby calculating the degree of tracking control $\Delta f$ Microcomputer 56 then adds or subtracts this degree of tracking control to or from the capstan speed instruction, i.e., a fixed capstan instruction value f, wherein the tracking is not considered, thereby converting to a speed instruction $f\pm\Delta f$ for capstan motor 59.

As a result, the, variable capstan speed instruction $f\pm\Delta f$ is formed, which then is converted into an analog signal in D/A converter 57. Then, capstan motor driver 58 controls the actual speed of capstan motor 59 so as to accord with the speed instruction.

The capstan motor of an 8 mm VCR is controlled to be rotated at a regular speed. Therefore, the degree of tracking control is added to the degree of speed control, thereby driving the capstan motor entirely.

Figure 8:
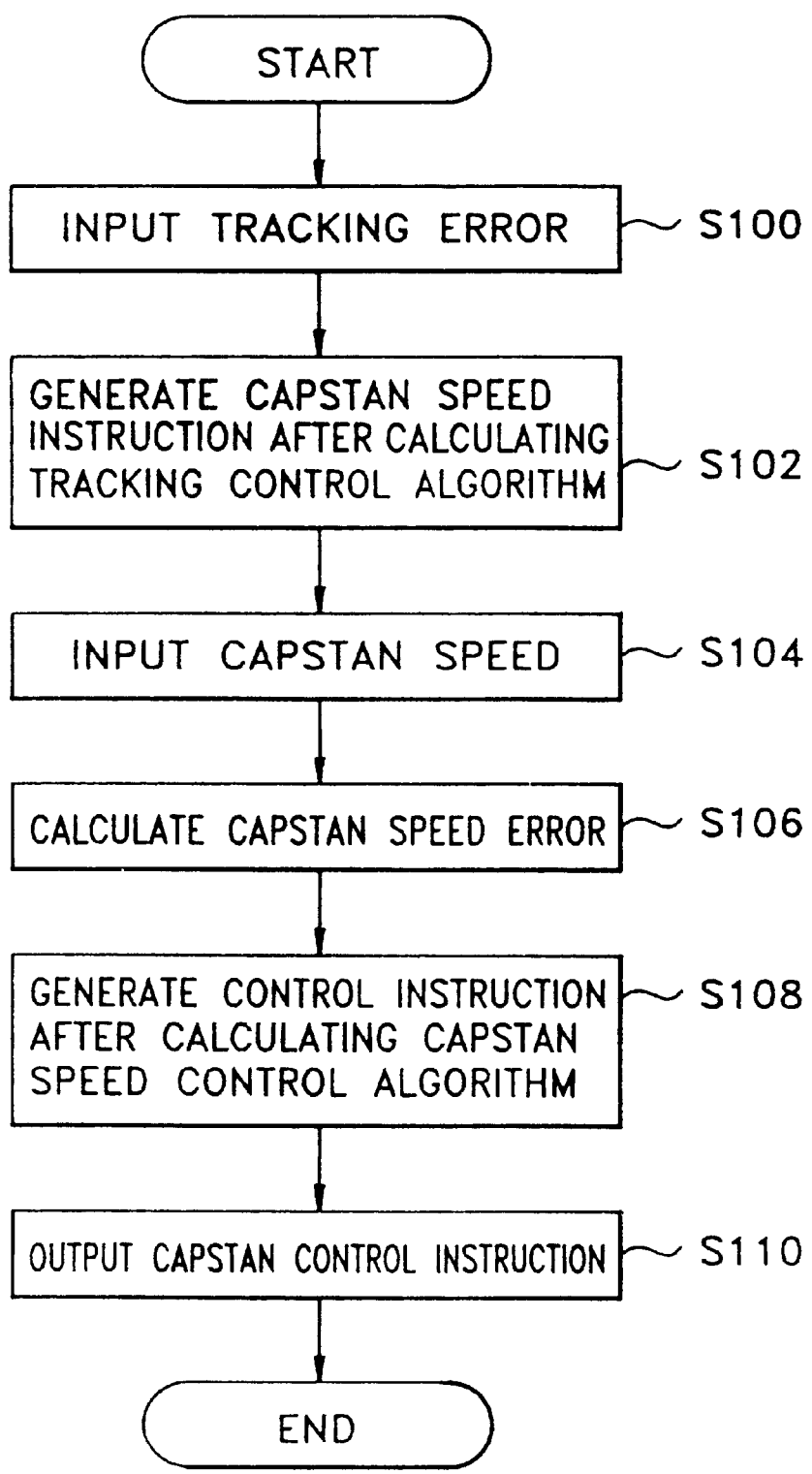
FIG. 8 is a flowchart showing the procedure of a tracking control method of a VCR according to the present invention.

FIG. 8 is a flowchart showing the procedure of the method of the present invention, wherein the process for calculating the degree of speed control of a capstan motor required when microcomputer 52 is used for tracking control is illustrated.

After step S100, wherein the tracking error is read from the microcomputer, the necessary degree of tracking control is determined by performing a proportional-integration-differentiation (PID) control algorithm on the above tracking error. Then, step S102 adds the degree of tracking control to the capstan speed instruction required for rotating the capstan motor at the speed required when there is no tracking error, and generates a new capstan speed instruction.

Then, the actual rotation speed of the capstan motor is input in step S104, and the degree of speed error is obtained in step S106 by calculating the difference between the actual rotation speed and the capstan speed instruction generated from step S102 (for example, the difference of clock frequency of pulse). Then, the capstan speed control signal is obtained in step S108 by performing a proportional-Integration-differentiation (PID) control algorithm process on the above degree of speed error. Then, the capstan speed control signal is output to capstan motor driver in step S110. Steps S100 to S110 repeat as a process cycle.

As described above, the present invention has good compatibility of tracking even when the devices for recording and reproducing are different. Also, when the track is largely curved, that is, when the linearity of track is poor, precise tracking is possible. Additionally, coefficient control and design for the system are easier since the control signal is processed in one direction.

What is claimed is:

1. A tracking control apparatus for an image recorder/reproducer which converts an applied tracking error into a degree of capstan speed control, said tracking error being reflected in generating a driving signal of a capstan motor, said tracking control apparatus comprising:

a tracking controller which outputs a variable capstan speed instruction, said instruction varying in accordance with a degree of tracking control calculated by performing a gain control on said tracking error; and a capstan speed controller which receives said capstan speed instruction from said tracking controller and performs a gain control on a speed error used in controlling said capstan motor and compares an actual capstan speed with said capstan speed instruction, and outputs said degree of capstan speed control;

wherein said tracking controller comprises:

a capstan phase controller which performs a gain control operation on said tracking error and outputs said degree of tracking control; and a capstan speed instruction generator which outputs said variable capstan speed instruction corresponding to said degree of tracking control;

wherein said capstan speed instruction generator is a voltage controlled oscillator which outputs a variable frequency signal that corresponds to said degree of tracking control.

2. A tracking control apparatus comprising:

a capstan motor which controls the running of a recording medium;

a capstan phase comparator which compares the phases of a head switching pulse having a pre-set frequency with that of a control pulse, and then outputs a degree of tracking error expressed by a respective phase difference;

a capstan phase controller which performs a calculation for gain control on said degree of tracking error, and then outputs a degree of tracking control;

a speed instruction generator which receives said degree of tracking control and generates a variable capstan speed instruction in accordance with said degree of tracking control;

a capstan speed error detector which compares said capstan speed instruction with an actual capstan speed, and then generates a speed error of said capstan motor;

a capstan speed controller which performs a calculation on the speed error of said capstan motor for gain control, and then outputs a capstan speed control signal;

a capstan motor driver which drives said capstan motor responsive to said capstan speed control signal;

wherein said capstan speed instruction generator is a voltage-controlled oscillator which outputs a variable frequency signal corresponding to said degree of tracking control.

* * * * *